Jan. 30, 1968 M. KODICH 3,366,530
COLOR TINTED PLASTIC CELLULAR HONEYCOMB TYPE STRUCTURES
Filed March 25, 1964
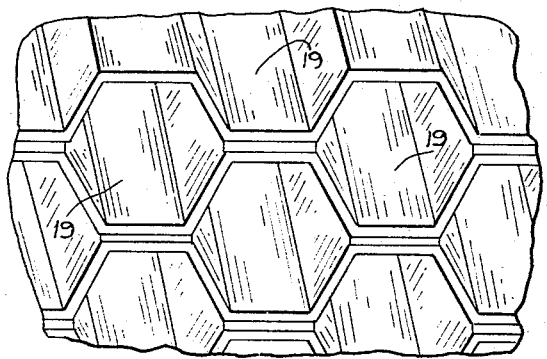
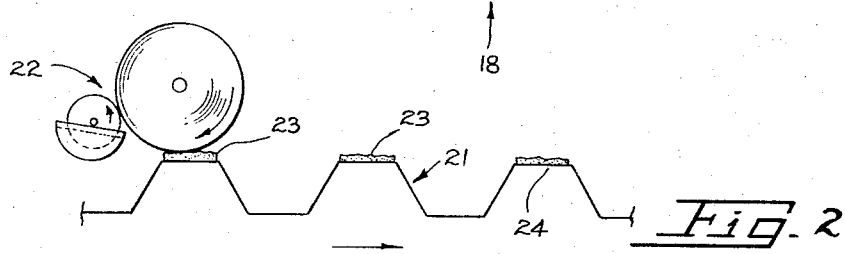
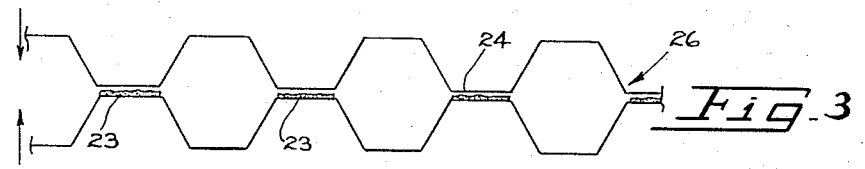
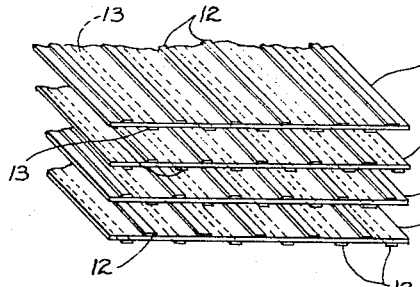
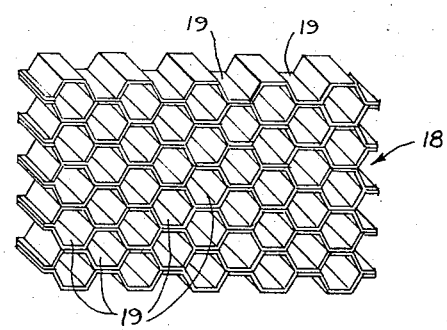
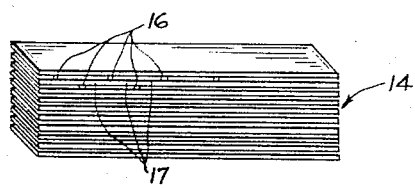
INVENTOR.
MOMIR KODICH
BY
Townsend and Townsend
ATTORNEYS ic Office 3,366,530
Patented Jan. 30, 1968

3,366,530
COLOR TINTED PLASTIC CELLULAR
HONEYCOMB TYPE STRUCTURES
Momir Kodich, El Cerrito, Calif., assignor to Hexcel Corporation, a corporation of California
Filed Mar. 25, 1964, Ser. No. 354,715
5 Claims. (Cl. 161—68)

ABSTRACT OF THE DISCLOSURE

Cellular honeycomb made of diaphanous plastic material and which is made to appear to have color through the use of pigmented adhesives at the node bonds.

---

This invention relates to the art of providing color tinted plastic cellular honeycomb type structures.

The particular embodiment of the invention which is illustrated in the drawings and which will be described hereinafter in more detail comprises a conventional plastic cellular type honeycomb made of substantially clear (transparent or translucent) sheet plastic material which, in the form of corrugated ribbons, are adhesively bonded or heat sealed together at contacting node areas to define a typical honeycomb open cell structure. The aforesaid node area at which the ribbons are bonded together have interspersed within them a dye or pigment of any desired color. The present invention resides in the concept and discovery of the fact that the color dye or pigment present only at the localized bonding nodes will be reflected, refracted and transmitted throughout the clear plastic cell walls to establish the optical illusion and effect of a plastic honeycomb structure that appears to be uniformly color tinted throughout all of its area.

A principal object and advantage of the present invention is to provide a method of fabricating what appears to be substantially uniformly color tinted plastic honeycomb structures without having to dye or pigment the plastic material itself. With the present invention, it is possible to provide colored plastic honeycomb type materials such as Mylar, Lexan, polyethylene, polyvinylchlorides and other sheet plastics which are commercially available in substantially clear, colorless, transparent, or translucent form. Certain plastics such as Lexan polyethylene and polyvinylchloride are capable of being pigmented or tinted in sheet form and as such can be purchased from commercial sources. However these materials are often times less readily available and may be somewhat more expensive than the same material in colorless form. Further, there is a very limited selection of colors and shades available in each of the pre-tinted materials. Other forms of sheet plastic of which I am aware (notably Mylar which has excellent property characteristics for many honeycomb applications), cannot, according to my understanding, be feasibly or practically pigmented or color tinted.

With the present invention it is possible to utilize sheet plastic material in its clear or colorless form and, merely through selection of an appropriate dye or pigment that can be intermixed with the adhesive utilized to bond the ribbons together at spaced intervals, to establish the illusion of a uniformly color tinted plastic material. In making of plastic honeycombs where the node bonds are formed by heat sealing adjacent sheets or ribbons together at their node points (instead of using intermediate adhesive lines to bond the material together) it is possible simply to stripe the thermoplastic sheets with suitable dyes or pigments at the areas where the heat sealing is to occur in order that the localized stripes or bands of color through reflection and refraction give a uniform color tint to the entire plastic structure.

An advantage of striping the plastic only in the node area is that the pigment is effectively sealed from the ambient atmosphere or protected by the ribbon material thereby insuring that the pigment layer will not wear off.

In addition to simple colored dyes or pigments, it is also contemplated that striking or unusual color effects could be obtained by using fluorescent or phosphorescent dyes or pigments as the coloring agent. Further it is apparent that multicolored effects may be obtained by using different colored dyes and pigments at different node bonding points in a given piece of honeycomb. It is within the skill of the art utilizing known honeycomb manufacturing procedures to apply lines of adhesive or stripes of coloring agents to opposite sides of the honeycomb ribbons to be bonded together or to stripe a given number of ribbons with one colored dye and to then stripe consecutively bonded ribbons or groups of ribbons with other colored dyes to obtain multicolored effects utilizing the genesis of the present invention.

Other objects and advantages of the present invention will become apparent upon reading the following specification and referring to the accompanying drawings in which similar characters of reference represent corresponding parts in each of the several views.

In the drawings:

FIGURE 1 is a perspective view showing a fragmentary expanded honeycomb structure forming an embodiment of the present invention.

FIGURE 2 is an end view of a preformed corrugated sheet of material with an adhesive applicator shown applying strips of pigmented adhesive material to node portions of the corrugated sheet and with the sheet shown schematically in single line thickness for purposes of clarity of illustration.

FIGURE 3 is a view similar to FIGURE 2 showing in exploded relation two corrugated sheets to be joined together by the adhesive material to form a partial honeycomb structure embodying the invention.

FIGURE 4 is a perspective view of a stack of sheets shown in exploded relationship prior to being assembled to form an unexpanded honeycomb structure in accordance with another embodiment of the present invention.

FIGURE 5 is a perspective view showing the sheets of FIGURE 4 as secured together to form an unexpanded stack of honeycomb but showing only a number of representative strips of adhesive material.

FIGURE 6 is a perspective view showing an expanded honeycomb structure according to the present invention.

The configuration or shape of honeycomb constructed in accordance with the present invention is generally similar to conventional honeycomb. With the present invention, however, the layers defining the cellular honeycomb structure are formed of a generally colorless diaphanous (transparent or translucent) material, and a plurality of stripes or areas of color, dyes or pigments are interposed respectively between the joined node portions of adjacent layers. This structure gives rise to the aforesaid reflective and refractive effects, whereby the whole structure partakes of the general hue of color originating from the individual interspersed stripes of color pigment.

To illustrate one embodiment of the invention, reference is made to FIGURE 4 wherein are shown a plurality of spaced generally planar layers 11 formed of a transparent plastic material such as Mylar. A first plurality of elongated transversely spaced stripes 12 of adhesive material are disposed on the upper sides of each layer, with a second plurality of spaced adhesive stripes 13 being disposed on the undersides of each layer. The stripes 13 are seen to be transversely spaced in relation to the stripes 12 on the opposite side of each sheet, with the stripes on confronting sides of adjacent sheets being aligned with one another. When the several sheets are brought together under suitable environmental conditions, a bond is formed therebetween along the aligned adhesive stripes, to form the unexpanded stack of honeycomb 14 as shown in FIGURE 5. It will be appreciated that the foregoing method of forming the unexpanded stack of honeycomb is only one of many well-known methods, and forms no part of the present invention. In accordance with the present invention, however, the adhesive stripes 12 and 13 contain a color, dye or pigment. When the layers are secured to form the unexpanded honeycomb stack 14 as shown in FIGURE 5, the colored adhesive stripes are disposed closely together so that a plurality of rows 16 of color are visualized in sharp distinction to the colorless regions 17 of the layers 11. When the honeycomb stack 14 is expanded to form a cellular structure 18 is shown in FIGURES 1 and 6, the existence of the color stripes 19 becomes almost imperceptible to the eye, and owing to the aforementioned reflective and refractive characteristics the whole cellular structure is imbued with the color from the stripes 19.

With thermoplastic resins such as Mylar, the stack 14 must be expanded under suitable heat conditions to allow the layers to assume the cellular configuration, after which the material can be cooled to set in the expanded cellular form. An example of a suitable adhesive and color pigment for use with Mylar is 90 percent by weight of Du Pont 46971 polyester adhesive with setting agent and 10 percent coloring powder, as for example, Victoria Blue (BO–C–8856 National Aniline Division, Allied Chemical Company).

In some instances it may be desirable to form the expanded honeycomb structure in a direct manner, by the use of preformed corrugated layers 21 such as the one shown in FIGURE 2. Such corrugated layers may for example be heat formed from thermosetting or thermoplastic sheet materials. An adhesive applicating device 22 can be used to apply layers 23 of adhesive material to the node portions 24 of each layer 21, with the adhesive material containing color pigments in accordance with the present invention. A plurality of stacked preformed corrugated layers 21 can then be secured together at adjacent node portions as shown in FIGURE 3, to form the cellular honeycomb structure 26 as shown therein. The color pigmented adhesive layers 23 provide the same visual effect for the structure 26 as described hereinabove with regard to the expanded honeycomb structure 18.

In addition to the use of adhesive materials, it will be appreciated that layers of plastic material can be secured together by other processes such as heat sealing. Should the latter method be used with the present invention, it is necessary only to interpose stripes or powderous deposits of color pigment material between the node portions to be secured together, so that the pigments are imbedded between the heat sealed portions of the plastic layers.

Although the present invention has been described in considerable detail for purposes of clarity of understanding, it is understood that certain changes and modifications may be made within the spirit of the invention as limited only by the scope of the claims appended hereto.

What is claimed is:

1. An expanded cellular honeycomb structure comprising a plurality of generally corrugated layers of generally diaphanous colorless material disposed in overlying relation with adjacent ones of said layers engaging one another along generally elongated parallel-spaced node portions, said engaging node portions being secured together, and color pigments being interposed between said secured node portions to define spaced parallel color stripes interspersed in said cellular structure, said color stripes being visible by refraction through and reflection on said diaphanous corrugated layers.

2. A honeycomb structure as described in claim 1 wherein a plurality of elongated stripes of adhesive material are interposed between said engaging node portions to secure them together, and said color pigment being contained in said adhesive material.

3. A honeycomb structure as described in claim 1 wherein said layers are made of a transparent plastic material.

4. A cellular honeycomb type structure comprising corrugated ribbon of substantially colorless plastic sheet material bonded together at localized contacting nodal areas; a coloring agent interspersed along said bonding lines, the color of said agent through light reflection and refraction occurring within the open clear plastic cell areas establishing the optical illusion of a plastic honeycomb structure which appears to be color tinted throughout all of its cellular areas.

5. An expanded cellular honeycomb structure comprising a plurality of generally corrugated layers of generally diaphanous material disposed in overlying relation with elongated parallel-spaced node portions, said engaging node portions being secured together, and color pigments being interposed between said secured node portions to define spaced parallel color stripes interspersed in said cellular structure, certain of said color stripes pigmented with one color, and others of said color stripes pigmented with a different color, said color stripes being visible by refraction through and reflection on said diaphanous corrugated layers.

References Cited

UNITED STATES PATENTS

| | | | |
|---|---|---|---|
| 2,828,235 | 3/1958 | Holland et al. | 161—409 X |
| 3,052,589 | 9/1962 | Ruscoe et al. | 156—277 |
| 3,137,609 | 6/1964 | Blaska | 161—6 X |
| 3,203,823 | 8/1965 | Grimes | 156—291 X |
| 3,231,452 | 1/1966 | Thomas | 161—68 |

EARL M. BERGERT, *Primary Examiner.*

H. F. EPSTEIN, *Assistant Examiner.*